Aug. 11, 1964 R. L. JEPSEN 3,144,616

HIGH FREQUENCY ELECTRON TUBE APPARATUS

Original Filed March 30, 1956

ROBERT L. JEPSEN
INVENTOR

BY [signature]

ATTORNEY

United States Patent Office 3,144,616

Patented Aug. 11, 1964

3,144,616
HIGH FREQUENCY ELECTRON TUBE APPARATUS

Robert L. Jepsen, Los Altos, Calif., assignor to Varian Associates, San Carlos, Calif., a corporation of California Original application Mar. 30, 1956, Ser. No. 575,161, now Patent No. 2,970,242, dated Jan. 31, 1961. Divided and this application Dec. 1, 1960, Ser. No. 72,899
1 Claim. (Cl. 330—43)

The present invention relates in general to high frequency apparatus and more specifically to novel apparatus for providing improved electrical performance of certain slow wave structures useful in velocity modulation type devices such as, for example, traveling wave tubes.

The merit of any specific amplifier is usually defined as the product of its gain and bandwidth. The traveling wave tube amplifier has excellent bandwidth characteristics compared to other high frequency amplifiers, 10%–120% depending on center frequency and on power load. However, the traveling wave tube amplifier, heretofore, has been limited in gain for stability (self-oscillation) reasons. Traveling wave tube amplifier gains approximating 20 db–45 db are obtainable depending on bandwidth and power output without self-oscillation developing from the positive feedback of energy to the input end of the slow wave structure. Self-oscillation may be caused by the reflection of wave energy from mismatched slow wave structure terminations or by reflections from the load.

The present invention provides apparatus for bettering the gain-bandwidth product of velocity modulation type amplifiers by providing non-reciprocal wave energy coupling (transmits energy one way only) from one beam-field interaction section or stage to a subsequent beam-field interaction section. This allows higher gain to be realized without introducing instability (self-oscillation) arising from the positive feedback of energy.

Accordingly, the principal object of the present invention is to provide novel improved slow wave apparatus useful in velocity modulation type devices wherein the beam-field interaction of the apparatus is improved without the introduction of instability arising from self-oscillation of the apparatus.

One feature of the present invention is a novel improved velocity modulation type apparatus wherein non-reciprocal energy coupling means is provided between certain beam-field interaction sections or stages whereby the interaction between the beam and fields of the apparatus is greatly enhanced and self-oscillation tendencies greatly reduced.

Another feature of the present invention is a novel improved traveling wave tube amplifier wherein a novel non-reciprocal energy transmission means is provided between successive sections of the slow wave structure whereby the amplifier merit and stability of the amplifier may be substantially improved.

Figure 2:
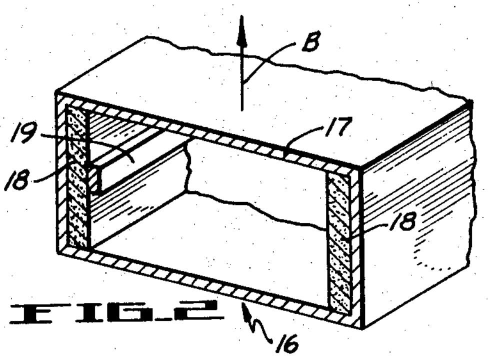
Figure 3:
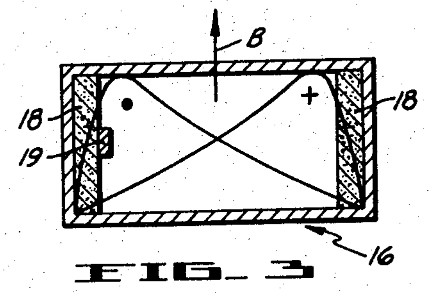
Figure 4:
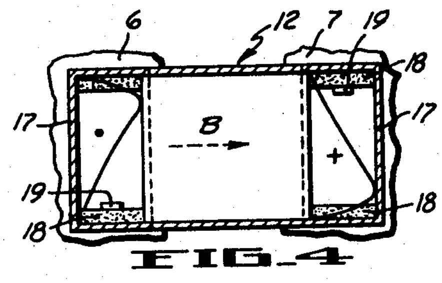
Figure 1:
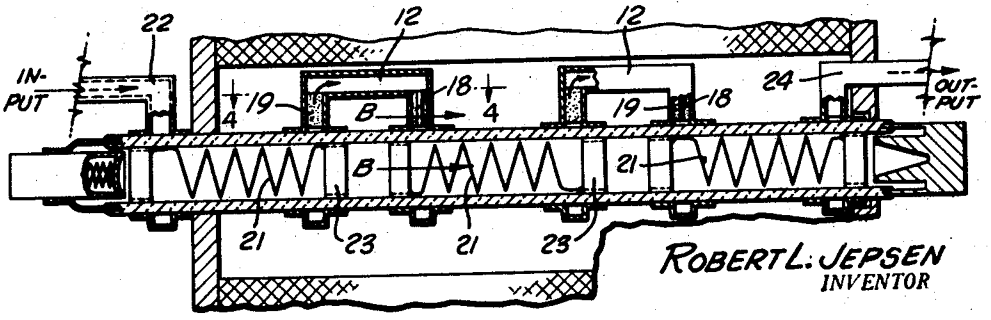

These and other features and advantages of the present invention will be more apparent after a perusal of the following specification taken in connection with the accompanying drawings wherein, FIG. 1 is an elevation view partly in longitudinal cross section of a novel tube apparatus of the present invention, FIG. 2 is an enlarged perspective view of a section of non-reciprocal waveguide, FIG. 3 is an end view of the structure of FIG. 2, and FIG. 4 is an enlarged cross sectional view of a portion of the structure of FIG. 1 taken along line 4—4 in the direction of the arrows.

A resistive-sheet isolater 16 comprises (see FIGS. 2 and 3) a length of rectangular waveguide 17. Two ferrite sheets 18 as of, for example, Feramic J. are carried within the waveguide. One ferrite sheet is disposed along each short side wall of the waveguide 17. A resistive strip 19 as of, for example, any conventional resistance card material, is disposed along one of the ferrite strips 18. When the ferrite-loaded waveguide is transversely magnetized by a strong magnetic field B, the fundamental $TE_{10}$ mode configuration is displaced as shown in FIG. 3. The ingoing or forward-traveling wave is displaced to the right. The reflected or backward-traveling wave is displaced to the left. This action places the strong electric fields of the backward-traveling wave in the area of the resistive strip 19. Since the resistive strip 19 is quite lossy the backward-traveling wave is strongly attenuated resulting in a high loss ratio of backward-traveling energy over forward-traveling energy.

Referring now to FIG. 1 there is shown a novel improved traveling wave tube amplifier incorporating the novel features of the present invention. The complete structure and operation of the traveling wave tube will not be fully described here as it is deemed well understood in the art. It will suffice to confine the description to the novel features of the device.

A plurality of slow wave structures 21 such as, for example, helices are successively arranged for interaction with a beam of electrons. Non-reciprocal transmission lines 12 as, for example, a resistive-sheet field displacement isolator 16 (FIG. 2) previously described supra, interconnect successive slow wave structures 21. The beam focusing field B supplies the necessary transverse magnetizing field for the resistive-sheet field displacement type isolator 16 (FIG. 2) forming the non-reciprocal transmission lines 12 (FIG. 1).

In operation, an input signal is supplied to the first slow wave structure via a waveguide 22. The signal wave is propagated along the first slow wave structure and interacts with the beam of electrons, gaining in amplitude by receiving energy therefrom. When the signal wave arrives at the termination 23 of the first slow wave structure the wave is radiated into the non-reciprocal transmission line 12 and is propagated therethrough to the beginning of the next slow wave structure. It is necessary at the confluence of the wave and beam at the beginning of the second slow wave structure 21 that the wave and the beam be combined in phase. This requires that the traveling wave in transmission line 12 have a phase delay with respect to the phase of the current modulation on the beam of $2\pi n$ where $n$ may have any plus or minus integer value including zero.

After the signal wave has been re-combined with the beam, the traveling wave electron beam interaction, described in reference to the first slow wave structure, is repeated in the second and third slow wave structures successively until the wave reaches the termination of the last slow wave structure. Thence the wave is radiated into a waveguide 24 and propagated to a load.

The non-reciprocal transmission lines 12 which interconnect successive slow wave structures 21 or beam-field interaction stages serve to attenuate any reflected or backward traveling waves thereby preventing the feedback of energy which would cause self-oscillation or reduce gain.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

This application is a division application of my co-pending application, Serial No. 575,161, filed March 30, 1956, for High Frequency Electron Tube Apparatus, now Patent No. 2,970,242, granted January 31, 1961.

What is claimed is:

A traveling wave tube amplifier including; means for forming and projecting a beam of electrons over an elongated beam path; means at the terminal end of said beam path for collecting and dissipating the energy of said electrons; circuit means disposed between said beam forming means and said beam collecting means along said beam path for cumulative electromagnetic interaction with said beam for amplifying signal waves on said circuit; means for applying signal energy to said electromagnetic interaction circuit means to obtain amplification of said signal wave energy; means disposed along said beam path for extracting amplified signal wave energy from said beam for propagation to a load; said interacting circuit means including a plurality of severed helices successively arranged along the beam path in axially spaced apart relation for electromagnetic interaction with the beam of electrons to produce signal current modulation on said beam, nonreciprocal resistive sheet field displacement isolator wave energy transmission means having a sending and receiving end thereto coupling together pairs of said severed helices for transmission of wave energy between said severed helices, whereby signal wave energy is propagated from one severed helix to another severed helix in the direction of beam travel for further cumulative electromagnetic interaction with the beam but preventing reflected wave energy traveling a direction opposed to the direction of electron travel from propagating back to the sending end of said nonreciprocal transmission means thereby greatly enhancing the gain characteristics of the amplifier without instability arising, and said nonreciprocal transmission means having an electrical path length for signal wave energy between coupled helices of said slow wave structure dimensioned such that the signal wave traveling in said nonreciprocal transmission means in the direction of electron travel experiences a phase delay with respect to the phase of the signal current modulation on the beam of substantially $2\pi n$ radians where $n$ can have any + or − integer value including 0.

References Cited in the file of this patent

UNITED STATES PATENTS

| | | |
|---|---|---|
| 2,740,917 | Haeff | Apr. 3, 1956 |
| 2,922,917 | Kompfner | Jan. 26, 1960 |
| 2,930,927 | Sensiper | Mar. 29, 1960 |
| 2,946,025 | Miller | July 19, 1960 |